US008570868B2

(12) United States Patent
Reumerman et al.

(10) Patent No.: US 8,570,868 B2
(45) Date of Patent: Oct. 29, 2013

(54) CONGESTION CONTROL IN A COMMUNICATION NETWORK BASED ON THE CSMA/CA PROTOCOL

(75) Inventors: Hans-Juergen Reumerman, Eindhoven (NL); Guido Roland Hiertz, Aachen (DE); Yunpeng Zang, Aachen (DE); Gustaf Sebastian Max, Cologne (DE); Lothar Stibor, Cologne (DE); Bernhard Walke, Wuerselen (DE)

(73) Assignee: Koninklijke Philips N.V., Eindhoven (NL)

( * ) Notice: Subject to any disclaimer, the term of this patent is extended or adjusted under 35 U.S.C. 154(b) by 310 days.

(21) Appl. No.: 12/746,777

(22) PCT Filed: Dec. 9, 2008

(86) PCT No.: PCT/IB2008/055155
§ 371 (c)(1),
(2), (4) Date: Jun. 8, 2010

(87) PCT Pub. No.: WO2009/074949
PCT Pub. Date: Jun. 18, 2009

(65) Prior Publication Data
US 2010/0260046 A1    Oct. 14, 2010

(30) Foreign Application Priority Data
Dec. 10, 2007  (EP) .................................. 07301651

(51) Int. Cl.
*G01R 31/08* (2006.01)
(52) U.S. Cl.
USPC ........................................................ 370/232
(58) Field of Classification Search
None
See application file for complete search history.

(56) References Cited

U.S. PATENT DOCUMENTS

| 2001/0014087 | A1* | 8/2001 | Sugaya et al. | 370/337 |
| 2005/0141087 | A1* | 6/2005 | Yoshida | 359/457 |
| 2005/0141545 | A1 | 6/2005 | Fein et al. | |
| 2005/0185629 | A1* | 8/2005 | Kuroda et al. | 370/347 |
| 2006/0194540 | A1* | 8/2006 | Hunzinger et al. | 455/41.2 |
| 2008/0219381 | A1* | 9/2008 | Karaoguz et al. | 375/316 |

FOREIGN PATENT DOCUMENTS

| EP | 1178634 A2 | 2/2002 |
| EP | 1592176 A1 | 11/2005 |
| EP | 1713291 A1 | 10/2006 |
| JP | 5075622 A | 3/1993 |

OTHER PUBLICATIONS

Takeshi: Neikkei Communications 2006, IEEE 802.11, WAVE (Wireless Access in Vehicular Environments) pp. 98-103.

\* cited by examiner

*Primary Examiner* — John Blanton

(57) ABSTRACT

A congestion control method for a communication system supporting layered radio channel structure for communication between at least a first communication device and a second communication device that offers a first and second types of service with corresponding first and second priority orders. The messages between devices include a preamble and a payload with each message being separated by at least a minimum allowable period. The first communication device generates a physical layer message pertaining to the first type of service, senses the radio channel idle for at least a period corresponding to the minimum allowable period between two messages, and transmits the physical layer message including a preamble indicative of the type of service the message pertains. The content of the preamble is detected by the second communication device within a communication range irrespective of the decoding state of the payload of the transmitted message.

11 Claims, 6 Drawing Sheets

CONGESTION CONTROL IN A COMMUNICATION NETWORK BASED ON THE CSMA/CA PROTOCOL

TECHNICAL FIELD

The present invention relates to a congestion control method for a communication system. The invention also relates to a corresponding computer program product and communication device.

BACKGROUND OF THE INVENTION

In wireless communication networks congestion control is an issue that needs to be addressed in order to have a network that operates smoothly thereby providing good quality of service (QoS) to its users. By "congestion" in communication networks is usually understood a situation, where the network is unable to deliver the offered load due to the insufficient capacity or overloaded traffic. The results of congestion are the degradation of QoS for the services, i.e. lower throughput, higher end-to-end packet delay, or even discard of packets in some severe cases.

Communication networks are known, which can provide two different types of services in terms of safety. First class of services includes only services related to safety or security, whereas the other service type provides other types of services, i.e. services that are not related to safety. An example of this kind of system is a wireless inter-vehicle communications (IVC) system, which is intended for improving the safety and comfort of driving. Generally, the services provided by IVC systems fall into two categories, namely safety services and non-safety services.

In IVC systems safety services provide the driver with information about critical situations in advance. Typical applications of this category include traffic signal violation warning, emergency electronic brake lights, pre-crash warning, cooperative danger warning dissemination, lane change warning, etc. Since closely related with human safety in high speed vehicular environments, these kinds of applications are characterised by the strict requirements on reliability and latency that is usually less than 100 milliseconds. On the other hand, intended for enhancing the driving comfort and improving the efficiency of transportation system, the non-safety services are usually assigned with lower priorities compared to the safety services. This category of applications, including traffic message dissemination, toll collection, electronic map download, multimedia applications and so on, usually require more bandwidth.

Owing to the ability of offering high-rate data transmission with low latency in a local range of several hundreds meters up to one kilometer, the Institute of Electrical and Electronics Engineers (IEEE) 802.11 wireless local area network (WLAN) technology is widely accepted as the enabling technology of medium access control (MAC) and physical layer (PHY) for the next generation IVC system. The IEEE WLAN MAC is based on carrier sense multiple access with collision avoidance (CSMA/CA), where each station follows a listen before talk and random backoff scheme to avoid collisions, as the distributed coordination function (DCF) specified in IEEE 802.11 standard. The priority of safety services is granted by assigning a relatively shorter channel sensing time and smaller random backoff slot number generating window, as the enhanced distributed channel access (EDCA) function specified in the IEEE 802.11e standard. However, in systems where the channel resource is shared by services with a priority of the first order, such as safety applications, and services with a priority of the second order, such as non-safety applications, e.g. IEEE 802.11p, the QoS of the safety applications may be compromised due to the channel congestion caused by the non-safety applications. In these systems, where the channel resource is shared by safety and non-safety services, non-safety applications may exhaust the channel resource, even if a higher priority has been assigned to the safety applications. Thus, it is desirable to avoid congestion in order to prevent the QoS degradation of services with a priority of the first order.

Thus, there is a need for an improved congestion control method.

SUMMARY OF THE INVENTION

According to a first aspect of the invention there is provided a congestion control method for a communication system supporting layered radio channel structure for communication between at least a first communication device and a second communication device, the layered structure comprising at least a physical layer and a medium access layer, the communication system offering a first type of service with a first priority order and a second type of service with a second priority order, in the communication system messages comprising a preamble and a payload can be transmitted between devices, each message being separated by at least a period corresponding to a minimum allowable period between two messages, the method comprises the following steps performed by the first communication device:

a generating a physical layer message pertaining to the first type of service;
 sensing the radio channel idle for at least a period corresponding to the minimum allowable period between two messages; and
 transmitting the physical layer message comprising a special preamble indicative of the type of service the message pertains, wherein the content of the preamble is arranged to be detected by the second communication device within a communication range irrespective of the decoding state of the payload of the transmitted message.

This provides the advantage that the congestion control is improved and this is especially advantageous in networks that offer services of two different types which are assigned different priorities. Examples of such services are for instance safety and non-safety applications. In these cases, the safety services are advantageously given higher priority and even if the network is congested, the safety messages can be transmitted and reliably received by terminals operating in the network.

According to a second aspect of the invention there is provided a computer program product comprising instructions for implementing the method according the first aspect of the invention when loaded and run on computer means of any of the communication devices.

According to a third aspect of the invention there is provided a communication device for a communication system supporting layered radio channel structure for enabling communication between at least the communication device and another communication device, the layered structure comprising at least a physical layer and a medium access layer, the communication system offering a first type of service with a first priority order and a second type of service with a second priority order, in the communication system messages comprising a preamble and a payload can be transmitted between devices, each message being separated by at least a period corresponding to a minimum allowable period between two messages, the communication device comprises:
- a physical layer message generator for generating a message pertaining to the first type of service;
- a radio channel detector for sensing the radio channel idle for at least a period corresponding to the minimum allowable period between two messages; and
- a transmitter for transmitting the physical layer message comprising a special preamble indicative of the type of service the message pertains, wherein the content of the preamble is arranged to be detected by the other communication device within a communication range irrespective of the decoding state of the payload of the transmitted message.

BRIEF DESCRIPTION OF THE DRAWINGS

Other features and advantages of the invention will become apparent from the following description of non-limiting exemplary embodiments, with reference to the appended drawings, in which.

DETAILED DESCRIPTION OF EMBODIMENTS OF THE INVENTION

In the following description some non-limiting exemplary embodiments of the invention will be described in more detail in the context of DCF in a CSMA/CA system. However, it is to be understood that the invention is not restricted to this environment, but the teachings of the invention are equally applicable in communication systems employing other multiple access schemes such as frequency division multiple access (FDMA). More specifically the CSMA/CA system, where some embodiments of the invention are described in more detail is an IVC system, where the physical and MAC layers are implemented in accordance with the IEEE 802.11p standards.

IEEE 802.11p has now become a worldwide WLAN standard for IVC systems. From the point of view of physical layer the frequency channel is divided into several channels for control and safety services or non-safety services. The channel for control and safety use can also be referred to as a control channel (CCH). The DCF, as the basic access mechanism of the IEEE 802.11 MAC, achieves automatic medium sharing between compatible devices through the use of CSMA/CA. Before the device starts transmission, it senses the wireless medium to determine if it is idle. If the medium appears to be idle, the transmission may proceed, otherwise the device will wait until the end of in-progress transmission. The CSMA/CA mechanism requires a minimum specified space between contiguous frame transmissions, also known as a short inter-frame space (SIFS), which is the shortest inter-frame space. A device will ensure that the medium has been idle for the specified inter-frame interval before attempting to transmit.

The distributed inter-frame space (DIFS) is used by devices operating under the DCF to transmit data frames. A device using the DCF has to follow two medium access rules: (1) the device will be allowed to transmit only if its carrier-sense mechanism determines that the medium has been idle for at least DIFS time; and (2) in order to reduce the collision probability among multiple devices accessing the medium, the device will select a random backoff interval after deferral, or prior to attempting to transmit another frame after a successful transmission. The device which has a data packet to transmit, draws a random number between 0 and contention window (CW), which determines the duration of the backoff timer in number of timeslots.

Figure 1:
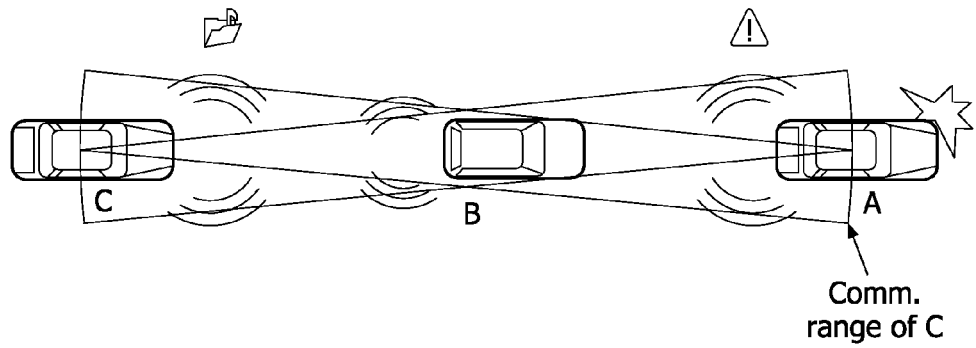
FIG. 1 shows three vehicles that are arranged to communicate with each other.

FIG. 1 shows an environment, where the teachings of the present invention can be applied. In FIG. 1 there are shown a first communication device A, a second communication device B and a third communication device C, all of which are vehicles in this example. In this example these vehicles are arranged to communicate in accordance with the IEEE 802.11p standard directly with each other. Thus, the communication between the wireless devices takes place over the air.

As shown in FIG. 1, three vehicles A, B and C are driving towards the same direction in this scenario. All vehicles are in the communication range of each other. A situation can now be considered in which vehicle A would like to transmit a warning message to other vehicles within its communication range, but in conventional systems this is impossible, if vehicles B and C already have an ongoing communication session. This is due to three problems that are identified below:

1) Although the safety messages have higher priority for accessing the channel, according to the 802.11 MAC protocol, the warning message generated at vehicle A has to wait until the channel becomes idle for at least a period corresponding to a point inter-frame space (PIFS), since the channel is currently occupied by non-safety transmission from vehicle C to vehicle B.

2) At the end of the non-safety data frame from vehicle C to vehicle B, according to the IEEE 802.11 MAC, a network allocation vector (NAV) has to be set till the end of the expected acknowledgement (ACK) frame from vehicle B to vehicle C. Therefore, the warning message can not grab the channel resource from the ACK frame transmitted by vehicle B, since the ACK frame is separated from the non-safety frame by only a period corresponding to SIFS, which is the shortest inter-frame space.

3) Following the ACK frame, vehicle C may go on with transmission after a SIFS without performing a backoff, as long as the transmit opportunity (TXOP) granted to it is not expired, according to the IEEE 802.11e MAC protocol. A TXOP is a bounded time interval during which a device can send as many frames as possible as long as the duration of the transmissions does not extend beyond the maximum duration of the TXOP. The warning message at vehicle A has to wait until the end of this TXOP, if no transmissions error occurs between vehicle B and vehicle C, and then contends for the channel access.

Figure 2:
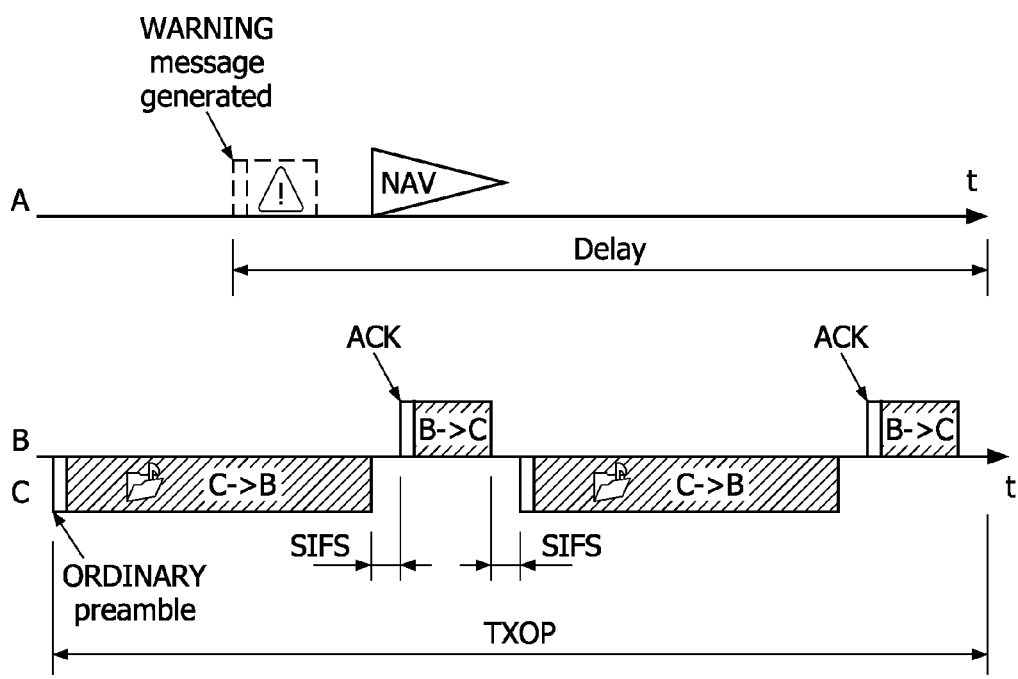
FIG. 2 shows possible messages transmitted along a time line between the vehicles of FIG. 1, when there is an ongoing communication of non-safety messages between vehicles B and C.

FIG. 2 shows the messages transmitted in the situation described above, where the warning message generated at vehicle A is delayed due to the ongoing non-safety transmission between vehicles B and C.

The solution proposed in the present invention is intended to grab the channel resource from an on-going transmission having a low priority by using an interruption based scheme. In the examples described below, by such a transmission is meant transmissions reserved for non-safety applications. A specially designed physical layer convergence procedure (PLCP) preamble, Warning_preamble in the examples below, is introduced for detecting the appearance of safety warning message even under interference from other transmission(s). And a Warning ACK frame is proposed to mute the transmitter out of range of the original warning message transmitter for the purpose of clearing channel resource for warning message dissemination.

The PLCP preamble is a special sequence of orthogonal frequency division multiplexing (OFDM) symbol patterns attached to the beginning of each IEEE 802.11a/p PLCP frame for timing acquisition, frequency acquisition and automatic gain control (AGC) at the receiver. The reception of the PLCP preamble does not need demodulation and decoding. Therefore, even in a severe signal to interference and noise ratio (SINR) situation, the PLCP preamble can still be easily detected. In this way, the content of the preamble is arranged to be detected within a communication range irrespective of the decoding state of the payload of a transmitted message. By introducing an easily distinguishable PLCP preamble for warning messages, the transmitter can indicate the presence of a danger warning message even if the warning message body is corrupted at the receivers due to the interference from the ongoing non-safety transmission(s).

The proposed channel resource grabbing scheme is based on the warning preamble and warning ACK can be characterised by the following features:

1) When a warning message is generated or received at a device, which is referred to as the "original warning station" in the following description, this device will transmit the warning message with warning preamble, after the channel has been sensed idle for a SIFS. During the channel sensing, the NAV setting caused by ongoing non-safety transmission is ignored;
2) Any device, which has finished a non-safety packet transmission and is expecting an ACK from the receiver, has to refrain from any further transmission and starts to backoff with the maximum contention window size for the non-safety service, if a warning preamble is detected SIFS after its own non-safety frame transmission, regardless of the decoding state of the ACK or warning message frame bodies;
3) Any device that has detected a warning preamble during the reception of non-safety packet has to transmit a warning ACK with the warning preamble SIFS after the end of previous non-safety frame reception, regardless the decoding state of the non-safety and warning message frame bodies.

Figure 3:
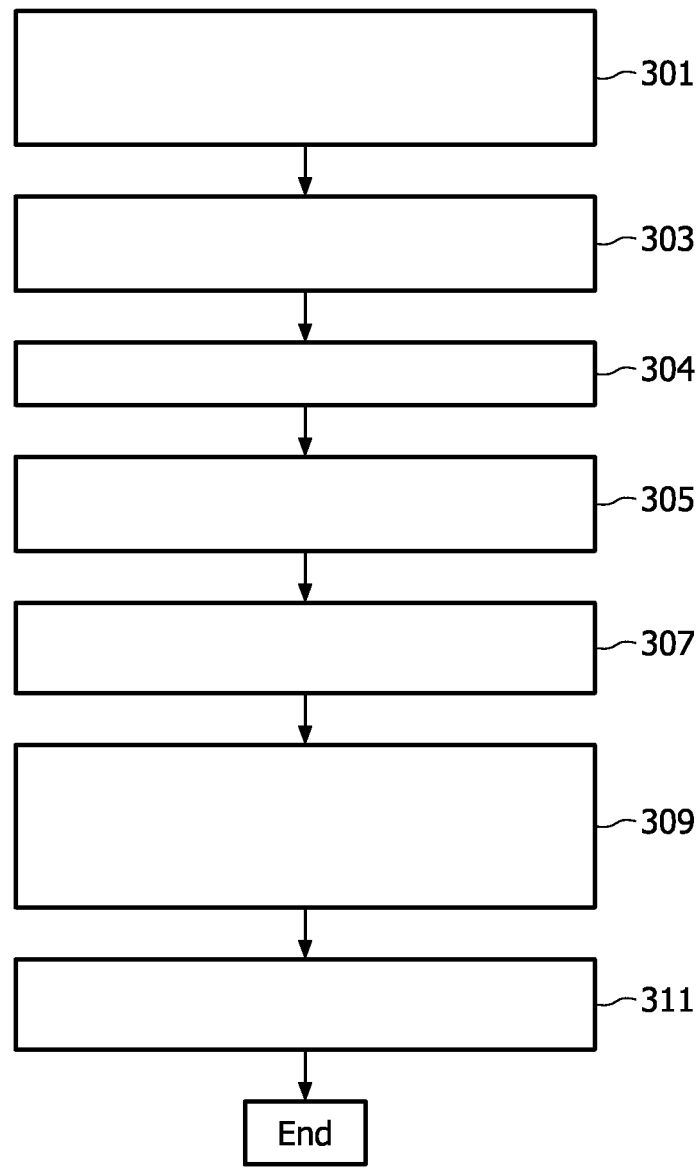
FIG. 3 is a simplified flow chart illustrating an embodiment in accordance with the present invention.
Figure 4:
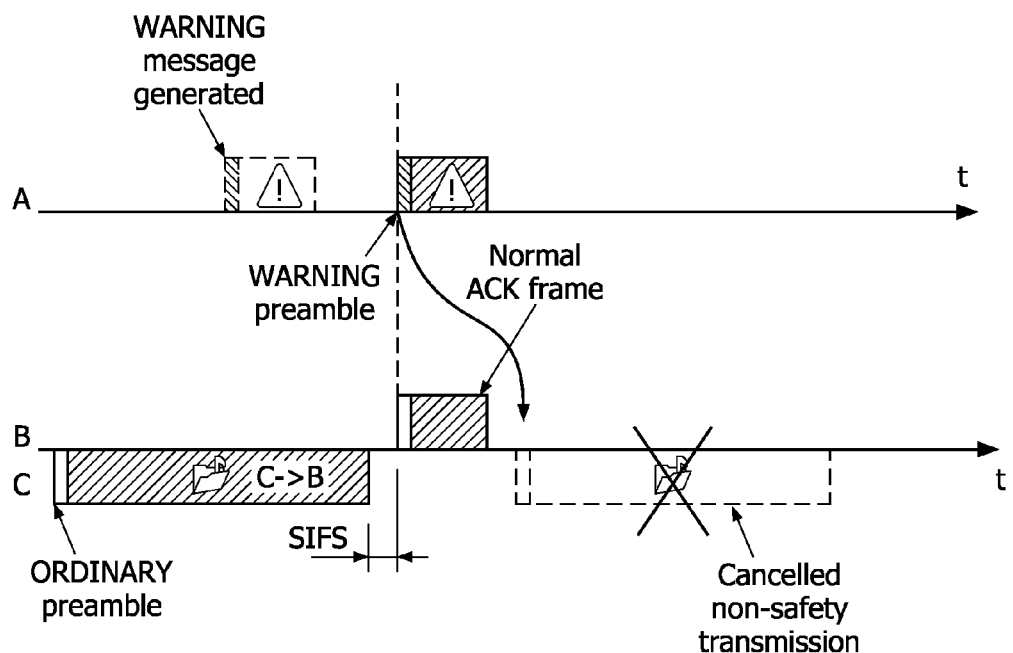
FIG. 4 shows possible messages transmitted along a time line between the vehicles of FIG. 1 in accordance with an embodiment of the present invention.

Next a first embodiment of the invention is described with reference to the flow chart of FIG. 3 and FIG. 4. In the first embodiment the three vehicles as shown in FIG. 1 are within communication range of each other.

First in step 301 vehicle A generates a warning message during the non-safety transmission from vehicle C to vehicle B. In step 303 vehicle A senses the channel idle for a SIFS and then in step 304 ignores the NAV setting and transmits in step 305 the warning message with warning preamble without delay.

The warning message transmitted by vehicle A may collide with the ACK frame from B. However, due to the warning preamble used by the warning message, vehicle C can still detect the appearance of the warning message. Thus, in step 307 vehicle C receives and detects the warning message from vehicle A.

Once vehicle C detects the warning preamble, it refrains in step 309 from further transmission and starts to backoff with the maximum contention window size for non-safety services. Then finally in step 311 the channel is cleared for warning message dissemination. The above procedure is also illustrated in FIG. 4 showing the different messages transmitted along a time line.

Figure 5:
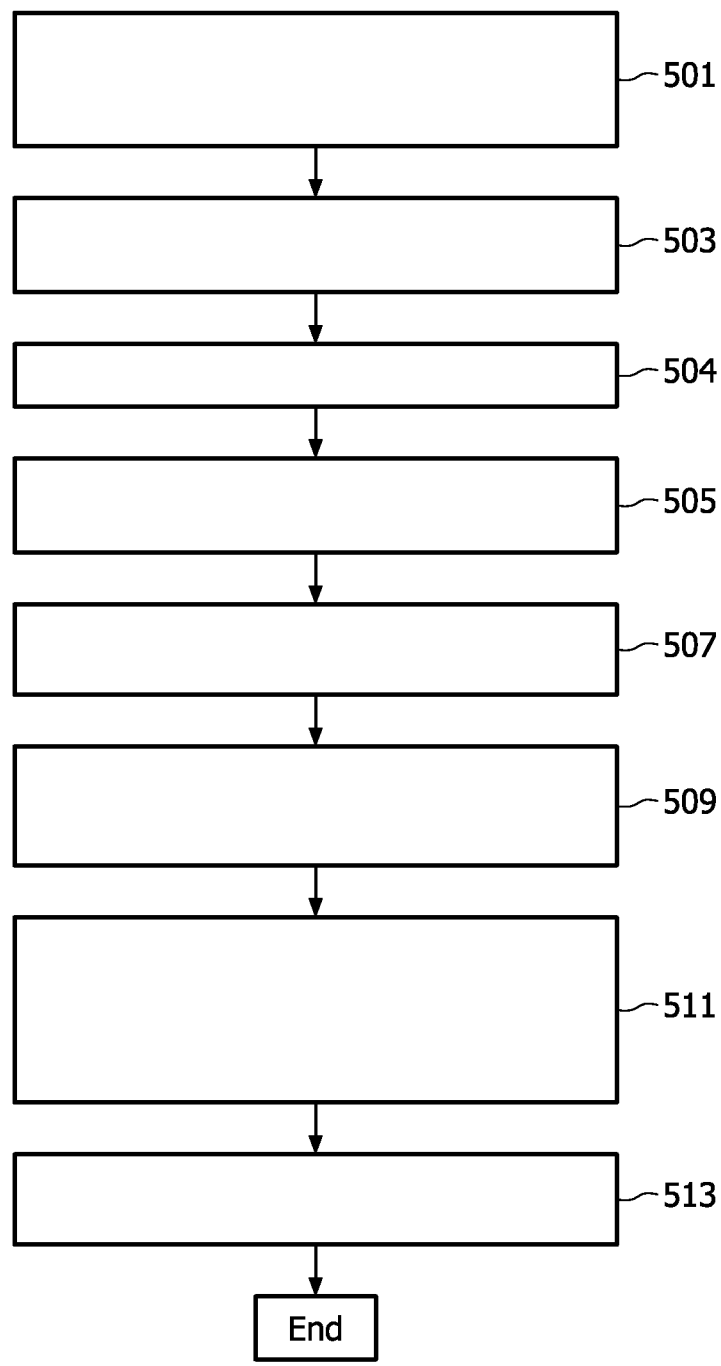
FIG. 5 is a simplified flow chart illustrating another embodiment in accordance with the present invention.
Figure 6:
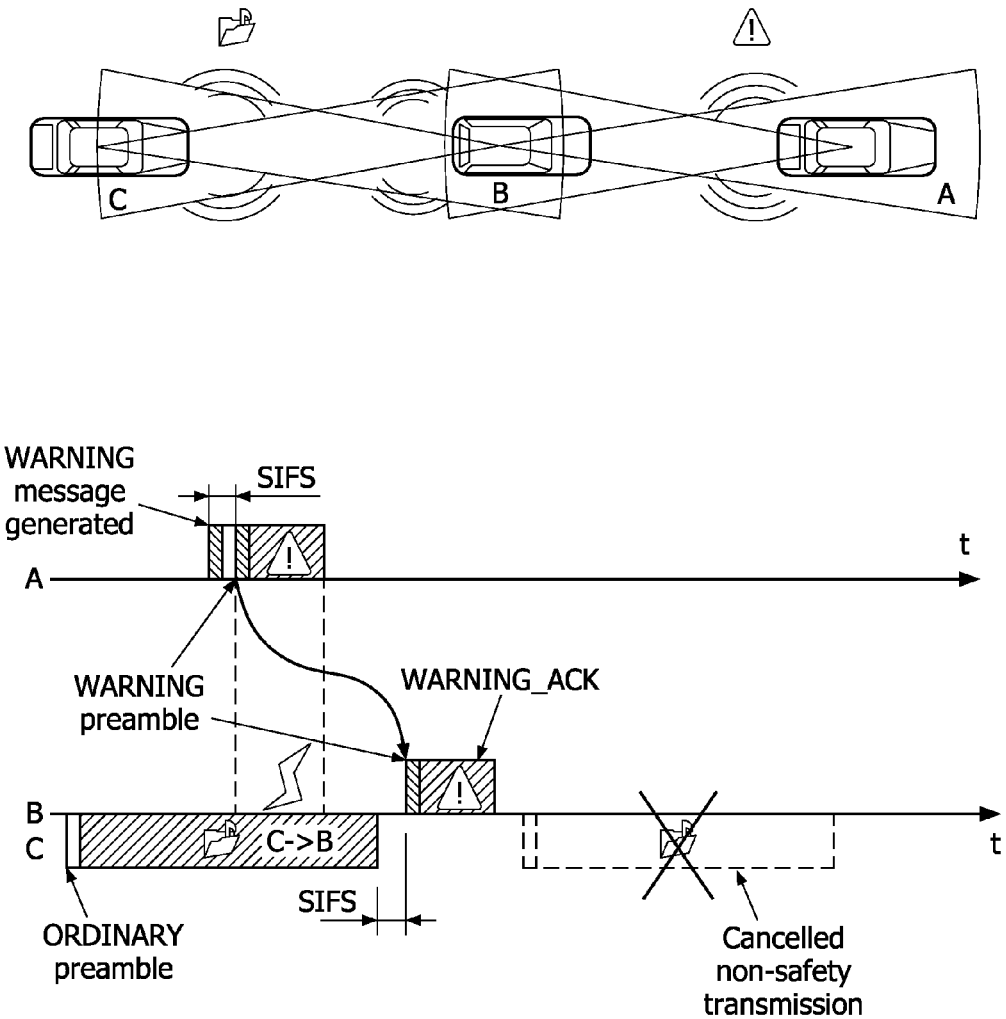
FIG. 6 shows the relation of the vehicles and the messages transmitted for the situation illustrated in the flow chart of FIG. 5.

The second embodiment of the present invention is next described with reference to the flow chart of FIG. 5 and FIG. 6. In the embodiment, original warning vehicle A is out of the communication range of non-safety transmitter vehicle C, while non-safety receiver vehicle B is in the range of original warning vehicle A.

First in step 501 vehicle A generates a warning message during the non-safety transmission from vehicle C to vehicle B. In step 503 vehicle A senses the channel idle for a SIFS and then in step 504 ignores the NAV set by vehicle B when transmitting a clear-to-send (CTS) message and transmits in step 505 the warning message with the warning preamble without delay. The steps 501, 503, 504 and 505 are actually the same as the steps 301, 303, 304 and 305 explained above.

The warning message transmitted by vehicle A may collide with the ongoing non-safety transmission at vehicle B. However, due to the warning preamble used by the warning message, vehicle B can still detect the appearance of the warning message. Thus, in step 507 vehicle B receives and detects the warning message from vehicle A. It is to be noted that since vehicle C is out of range of vehicle A, it cannot receive transmissions from vehicle A.

Even if the frame bodies cannot be decoded at vehicle B, it is still able to transmit in step 509 a warning ACK with warning preamble a SIFS after the end of the non-safety frame. Once vehicle C receives the warning ACK or on detection of warning preamble, vehicle C refrains in step 511 from further transmission and starts to backoff with the maximum contention window size for non-safety services. Then finally in step 513 the channel is cleared for warning message dissemination. The above procedure is also illustrated in FIG. 6 showing the different messages transmitted along a time line.

Figure 7:
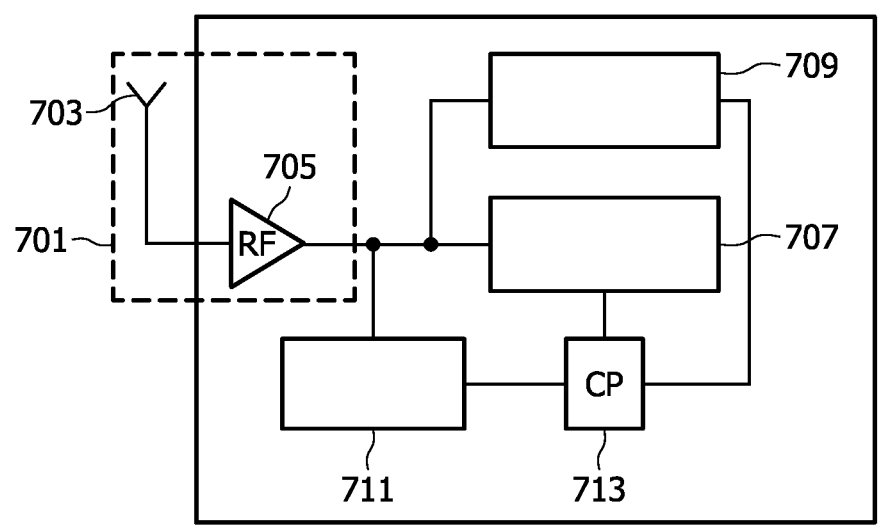
FIG. 7 is a simplified block diagram of a communication device in accordance with an embodiment of the present invention.

In FIG. 7 there is shown a simplified block diagram of the communication device that can operate in accordance with the teachings explained above. In Figure there is shown a transmitter/receiver part 701 comprising an antenna 703 and an RF section 705 of which purpose is to choose the incoming signal from the antenna 703 and amplify the received signal. Then there are also shown a physical layer message generator 707 and a MAC layer message generator 709, which are arranged to generate the warning preamble and the warning ACK frame, respectively. A channel detector 711 is used to detect whether the channel is idle or whether is reserved for communication. A central processor (CP) 713 is used to control the overall operation of the communication device. It is to be noted that only some blocks relevant to the teachings of the present invention are shown in FIG. 7. Other blocks are omitted in this context, but they are known to a skilled man in the art.

The invention equally relates to a computer program product that is able to implement any of the method steps of the embodiments of the invention when loaded and run on computer means of the devices mentioned above. A computer program may be stored/distributed on a suitable medium supplied together with or as a part of other hardware, but may also be distributed in other forms, such as via the Internet or other wired or wireless telecommunication systems.

The invention equally relates to an integrated circuit that is arranged to perform any of the method steps in accordance with the embodiments of the invention.

While the invention has been illustrated and described in detail in the drawings and foregoing description, such illustration and description are to be considered illustrative or exemplary and not restrictive; the invention is not restricted to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that different features are recited in mutually different dependent claims does not indicate that a combination of these features cannot be advantageously used. Any reference signs in the claims should not be construed as limiting the scope of the invention.

The invention claimed is:

1. A congestion control method for a communication system supporting layered radio channel structure for communication between at least a first communication device and a second communication device, the layered structure comprising at least a physical layer and a medium access layer, the communication system offering a first type of service with a first priority order and a second type of service with a second priority order with messages comprising a preamble and a payload transmitted between devices, each physical layer and medium access layer message being separated by at least a period corresponding to a minimum allowable period between messages, the method comprises the following acts performed by the first communication device:
    generating a physical layer message pertaining to the first type of service;
    sensing the radio channel idle for at least a period corresponding to the minimum allowable period between messages; and
    transmitting the physical layer message comprising a preamble indicative of the type of service the message pertains, wherein the content of the preamble is arranged to be detected by the second communication device within a communication range even if the payload of the transmitted message is corrupted by interference.

2. The method according to claim 1, further comprising and act of ignoring a network allocation vector set by the second communication device.

3. The method according to claim 1, wherein the preamble further comprises an indication to the second communication device to refrain from any transmissions of messages pertaining to the service of the second type and starts to backoff with the maximum contention window size.

4. The method according to claim 1, wherein the preamble further comprises an indication for the second communication device to transmit a warning message to a third communication device for preventing the third communication device from transmitting messages pertaining to the second type, wherein the warning message is a medium access control layer message.

5. The method according to claim 1, wherein the messages pertaining to the first type of service are safety related messages, whereas the messages pertaining to the second type of service are non-safety related messages.

6. A non-transitory computer program product comprising instructions for implementing the acts of a method according to claim 1 when loaded and run on a processor of a communication device.

7. A communication device for a communication system supporting layered radio channel structure for enabling communication between at least the communication device and another communication device, the layered structure comprising at least a physical layer and a medium access layer, the communication system offering a first type of service with a first priority order and a second type of service with a second priority order with messages comprising a preamble and a payload can be transmitted between devices, each physical layer and medium access layer message being separated by at least a period corresponding to a minimum allowable period between two messages, the communication device comprising:
    a physical layer message generator configured to generate a physical layer message pertaining to the first type of service;
    a radio channel detector configured to sense the radio channel idle for at least a period corresponding to the minimum allowable period between two messages; and
    a transmitter configured to transmit the physical layer message comprising a preamble indicative of the type of service the message pertains, wherein the content of the preamble is arranged to be detected by the other communication device within a communication range even if the payload of the transmitted physical layer message is corrupted by interference.

8. The communication device according to claim 7, further comprising a medium access control message generator configured to generate a warning message upon reception of the message pertaining to the first type of service.

9. A congestion control method for a communication system supporting layered radio channel structure for communication between at least a first communication device and a second communication device, the layered structure comprising at least a physical layer and a medium access layer, the communication system offering a first type of service with a first priority order and a second type of service with a second priority order with messages comprising a preamble and a payload transmitted between devices, each physical layer and medium access layer message being separated by at least a period corresponding to a minimum allowable period between messages, the method comprises the following acts performed by the first communication device:
    generating a physical layer message pertaining to the first type of service;
    sensing the radio channel idle for at least a period corresponding to the minimum allowable period between messages; and
    transmitting the physical layer message comprising a preamble indicative of the type of service the message pertains, wherein the content of the preamble is arranged to be detected by the second communication device within a communication range irrespective of the decoding state of the payload of the transmitted message,
    wherein the preamble further comprises an indication to the second communication device to refrain from any transmissions of messages pertaining to the service of the second type and to backoff with the maximum contention window size.

10. A congestion control method for a communication system supporting layered radio channel structure for communication between at least a first communication device and a second communication device, the layered structure comprising at least a physical layer and a medium access layer, the communication system offering a first type of service with a first priority order and a second type of service with a second priority order with messages comprising a preamble and a payload transmitted between devices, each physical layer and medium access layer message being separated by at least a period corresponding to a minimum allowable period between messages, the method comprises the following acts performed by the first communication device:

- generating a physical layer message pertaining to the first type of service;
- sensing the radio channel idle for at least a period corresponding to the minimum allowable period between messages; and
- transmitting the physical layer message comprising a preamble indicative of the type of service the message pertains, wherein the content of the preamble is arranged to be detected by the second communication device within a communication range irrespective of the decoding state of the payload of the transmitted message,
- wherein the preamble further comprises an indication for the second communication device to transmit a warning message to a third communication device for preventing the third communication device from transmitting messages pertaining to the second type, wherein the warning message is a medium access control layer message.

11. A communication device for a communication system supporting layered radio channel structure for enabling communication between at least the communication device and another communication device, the layered structure comprising at least a physical layer and a medium access layer, the communication system offering a first type of service with a first priority order and a second type of service with a second priority order with messages comprising a preamble and a payload transmitted between devices, each physical layer and medium access layer message being separated by at least a period corresponding to a minimum allowable period between two messages, the communication device comprising:

- a physical layer message generator configured to generate a physical layer message pertaining to the first type of service;
- a radio channel detector configured to sense the radio channel idle for at least a period corresponding to the minimum allowable period between two messages;
- a transmitter configured to transmit the physical layer message comprising a preamble indicative of the type of service the message pertains, wherein the content of the preamble is arranged to be detected by the other communication device within a communication range irrespective of the decoding state of the payload of the transmitted physical layer message; and
- a medium access control message generator configured to generate a warning message upon reception of the message pertaining to the first type of service.

* * * * *